(12) United States Patent
Bloemenkamp et al.

(10) Patent No.: US 10,689,968 B2
(45) Date of Patent: Jun. 23, 2020

(54) APPARATUS FOR BOREHOLE IMAGING INCLUDING A VOID-CONTAINING GUARD ELECTRODE

(71) Applicant: Schlumberger Technology Corporation, Sugar Land, TX (US)

(72) Inventors: Richard Bloemenkamp, Fontenay-aux-Roses (FR); Francisco de Almeida Braz, Plaisir (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 104 days.

(21) Appl. No.: 15/988,009

(22) Filed: May 24, 2018

(65) Prior Publication Data

US 2019/0360322 A1    Nov. 28, 2019

(51) Int. Cl.
*G01V 3/30*   (2006.01)
*E21B 47/01*  (2012.01)
(Continued)

(52) U.S. Cl.
CPC .............. *E21B 47/011* (2013.01); *G01V 3/20* (2013.01); *G01V 3/30* (2013.01); *G01V 3/34* (2013.01)

(58) Field of Classification Search
CPC . G01V 3/20; G01V 11/00; G01V 3/24; G01V 3/38; G01V 11/002; G01V 3/26; G01V 3/28; G01V 3/30; G01V 11/005; G01V 13/00; G01V 3/265; G01V 3/18; G01V 3/34; E21B 49/10; E21B 47/122; E21B 43/2401; E21B 47/01; E21B 49/00; E21B 17/003; E21B 49/087; E21B 7/04; E21B 34/066; E21B 44/02; E21B 47/022; E21B 47/16; E21B 47/18; E21B 49/003; E21B 7/068; E21B 44/005; E21B 47/024;
(Continued)

(56) References Cited

U.S. PATENT DOCUMENTS 5,335,542 A *  8/1994  Ramakrishnan .... E21B 33/1246
                                                  166/250.02
8,390,295 B2 *  3/2013  Gorek ...................... G01V 3/20
                                                    166/254.1
(Continued)

FOREIGN PATENT DOCUMENTS

WO    2014200996 A2    12/2014

*Primary Examiner* — Vinh P Nguyen

(57) ABSTRACT

This disclosure relates to a sensor for imaging boreholes with improved durability to impact along the wall of the borehole, which may protect the sensor from premature wear. Such an apparatus may include a housing, one or more button electrodes coupled to the housing, one or more current return electrodes couple to the housing, and a guard electrode disposed at least partly around the one or more button electrodes. The one or more button electrodes may transmit or receive an electrical or electromagnetic signal through the underground formation, and the one or more current return electrodes receive or transmit the signal. The guard electrode may block portions of the electrical or electromagnetic signal that did not pass through the underground formation. In addition, the guard electrode may include a number of holes to enable the guard electrode to couple to the housing while providing additional structural durability.

19 Claims, 8 Drawing Sheets

(51) Int. Cl.
*G01V 3/34* (2006.01)
*G01V 3/20* (2006.01)

(58) Field of Classification Search
CPC .... E21B 47/12; E21B 49/005; E21B 47/0002; G01N 27/223; G01N 33/2823; G01N 15/0826; G01N 27/221; G01N 47/011; G01R 3/00
See application file for complete search history.

(56) References Cited

U.S. PATENT DOCUMENTS

| | | |
|---|---|---|
| 8,776,878 B2 | 7/2014 | Bloemenkamp et al. |
| 9,400,339 B2 | 7/2016 | Bloemenkamp et al. |
| 10,386,527 B2 * | 8/2019 | Budan ..................... G01V 3/24 |

* cited by examiner

APPARATUS FOR BOREHOLE IMAGING INCLUDING A VOID-CONTAINING GUARD ELECTRODE

BACKGROUND

This disclosure relates to detecting conditions of a borehole. In particular, this disclosure relates to an apparatus for sensing a condition of a borehole having structural components that improve durability.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Identifying the composition of a geological formation can provide information about the likely presence or absence of hydrocarbons. As such, many downhole tools have been developed that attempt to analyze the geological formation from within a wellbore. These tools include, among other things, formation electrical resistivity logging tools. By measuring the electrical resistivity through the geological formation, the composition of the geological formation may be ascertained at various depths through the well.

But a downhole tool might not operate effectively if the downhole tool measurements cannot penetrate borehole fluid in the wellbore that functions as an insulator between the downhole tool and the geological formation. By forcing the downhole tool against the wellbore wall, less wellbore fluid may intervene. Applying pressure to the downhole tool against the wellbore wall, or scraping the downhole tool against the wellbore wall, however, may cause the downhole tool to erode or break.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present techniques are directed to an apparatus for measuring properties of an underground geological formation that includes a housing. The apparatus also includes one or more button electrodes coupled to the housing, wherein the one or more button electrodes are configured to transmit or receive an electrical or electromagnetic signal through the underground formation. Further, the apparatus includes one or more current return electrodes couple to the housing, wherein the one or more current return electrodes are configured to receive or transmit the electrical or electromagnetic signal through the underground formation. Further still, the apparatus includes a guard electrode disposed at least partly around the one or more button electrodes, wherein the guard electrode is configured to block portions of the electrical or electromagnetic signal that did not pass through the underground formation, and wherein the guard electrode has multiple holes that extend along a depth of the guard electrode to enable the guard electrode to be fixedly coupled to the housing.

In another embodiment, the present techniques are directed to a method of manufacturing an apparatus for measuring properties of an underground geological formation surrounding a borehole that includes providing a housing. Further, the method includes coupling one or more button electrodes to the housing, wherein the one or more button electrodes are configured to transmit or receive an electrical or electromagnetic signal through the underground geological formation while the apparatus is disposed in a borehole in the underground geological formation. Even further, the method includes coupling one or more current return electrodes to the housing, wherein the one or more current return electrodes are configured to receive or transmit the electrical or electromagnetic signal. Further still, the method includes coupling a guard electrode to the housing, wherein the guard electrode surrounds a perimeter of the one or more button electrodes, wherein the guard electrode is configured to block portions of the electrical or electromagnetic signal that do not pass through the underground formation, and wherein the guard electrode includes multiple holes. Then, the method includes positioning multiple pins within the multiple holes of the guard electrode to couple the guard electrode to the housing to support the guard electrode against forces normal to the orientation of the multiple pins.

In another embodiment, the present disclose relates to an apparatus for determining properties of an underground geological formation that includes a housing. The apparatus also includes one or more button electrodes coupled to the housing, wherein the one or more button electrodes are configured to transmit or receive an electrical or electromagnetic signal through the underground formation. Further, the apparatus includes one or more current return electrodes coupled to the housing, wherein the one or more current return electrodes are configured to measure electrical properties of the underground formation at least in part by receiving or transmitting the electrical or electromagnetic signal through the underground formation. Even further, the apparatus includes a guard electrode disposed at least partly around one or more button electrodes, wherein the guard electrode comprises multiple holes that extend along a depth of the guard electrode. Further still, the apparatus includes multiple of pins that each reside within the multiple holes of the guard electrode wherein the multiple pins are configured to couple the guard electrode to the housing. The apparatus also includes a coupling component disposed around a wall of the guard electrode that is flush with an inner portion of the housing.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
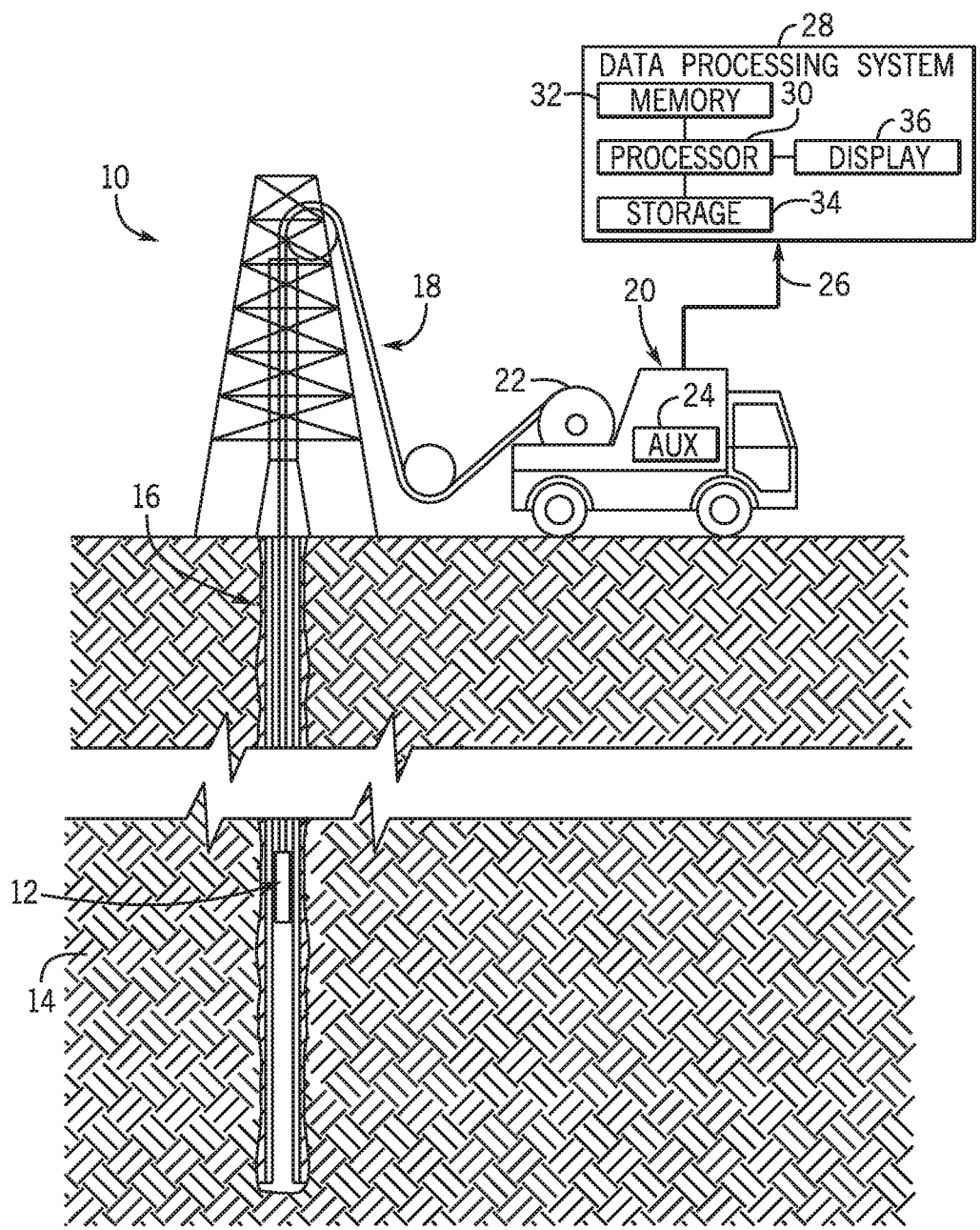
FIG. 1 is a schematic diagram of a well-logging system that employs a logging winch system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One way to identify hydrocarbon pay zones in a geological formation is through geological formation electrical resistivity logging. Geological formation electrical resistivity logging, as described in this disclosure, relates to using electrical resistivity characteristics of the geological formation. Hydrocarbon molecules in the geological formation, such as reservoir oil, may affect resistivity of the geological formation in a known manner. Hence, with electrical resistivity logging, the presence of reservoir oil can be identified by comparing a measured resistivity to known values representing geological formations containing oil.

As noted above, a downhole tool may not be able to predict the properties of the geological formation if the downhole tool measurements cannot penetrate borehole fluid in the wellbore. Indeed, borehole fluid in the wellbore may provide an insulating layer between a downhole tool and the geological formation. If this happens, the downhole tool may emit and detect current not from the geological formation, but rather from the borehole fluid moving through the wellbore. By pressing the downhole tool against the wellbore wall, less wellbore fluid may intervene. In view of this compression, the pad undergoes mechanical constraints and contact with external elements and must therefore be able to resist to these constraints and be sealed. The present disclosure is directed to an imaging pad with improved durability, increased sealing leaks, and ease of assembly.

With this in mind, FIG. 1 illustrates a well-logging system 10 that may employ the formation texture and rock type identification systems and methods of this disclosure. The well-logging system 10 may be used to convey a downhole tool 12 through a geological formation 14 via a wellbore 16 (also sometimes referred to as a borehole). The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses electrical sensors to obtain high-resolution measurements of the wellbore 16 wall.

As discussed further below, the downhole tool 12 may include a number of sensors used to acquire data 26 about the wellbore 16 and/or geological formation 14 by taking measurements (e.g., electrical current measurements, electromagnetic measurements). For example, the data 26 may be used to produce images of the wellbore 16 obtained via sensor pads. The data 26 may be sent to a data processing system 28. The data processing system 28 may analyze the data 26 to reconstruct a high-resolution fullbore image used to determine characteristics (e.g., long/short axis, patches size, roundness, sphericity, and patch orientation) of sediment particles identified in the fullbore image, among other things. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20, a remote device that analyzes data from other logging winch systems 20, or partly local and partly remote. In some embodiments, the data processing system 28 may be a mobile computing device (e.g., tablet, smartphone, or laptop) or a server remote from the logging winch system 20.

Figure 2:
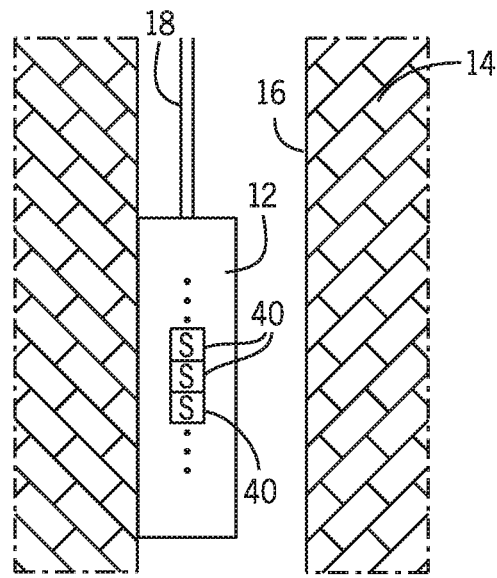
FIG. 2 is a schematic diagram of a downhole tool used by the well-logging system of FIG. 1, in accordance with an embodiment.

FIG. 2 is a schematic diagram of the downhole tool 12 used by the well-logging system 10 of FIG. 1, in accordance with an embodiment. As illustrated, the downhole tool 12 may include a number of sensors, which are shown here as imaging pads 40 that are used to measure characteristics of the formation 14. In some embodiments, any number of imaging pads 40 (e.g., 1 to 10, or greater than 10) may be used. In some embodiments, the imaging pads 40 may not fully cover the circumference of the wellbore 16, resulting in gaps circumferentially spaced apart within the borehole image. The processor 30 may reconstruct a complete borehole image by filling in the gaps. In some embodiments, the processor 30 may use techniques such as those disclosed in Patent Application No. PCT/US2014/041702, which is incorporated by reference herein for all purposes.

Figure 3:
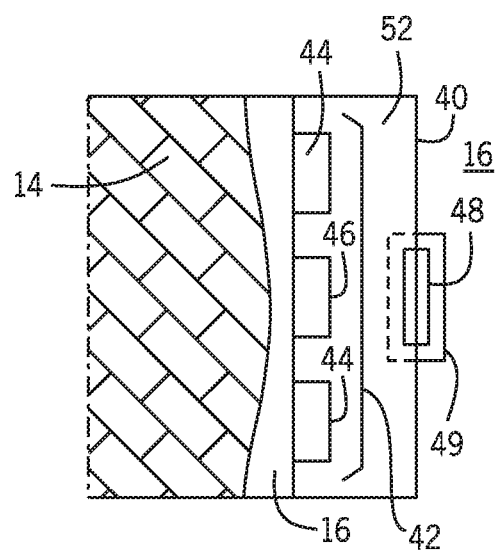
FIG. 3 is schematic diagram of an imaging pad of the downhole tool of FIG. 2 in operation, in accordance with an embodiment.

In some embodiments, the downhole tool 12 may be sufficiently close to the sidewall of the wellbore 16 such that the imaging pads 40 may contact the formation 14. FIG. 3 shows an imaging pad 40 in operation (e.g., obtaining data that is indicative of the features of a wellbore 16 and/or the geological formation 14) that is in contact with the formation. The downhole tool 12 is not shown in the drawing, however it should be appreciated that the imaging pad 40 may be part of a downhole tool 12. As discussed herein, the imaging pad 40 may include several electrodes 42 (e.g., one or more button electrodes 46 and one or more current return electrodes 44). The button electrodes 46 may be relatively small (less than 500 mm$^2$, e.g., 20 mm$^2$) and are suitable for detecting electrical formation properties right in front of the button electrode 46 (e.g., towards the formation 14). The imaging pad 40 includes a case 50 and a pad cover 52 illustrated in FIG. 3. The case 50 and the pad cover 52 may be collectively referred to as the housing (e.g., 51 shown in FIG. 6). The pad cover 52 is situated at the front end of the imaging pad 40 and is disposed to contact the formation 14. It includes two current return electrodes 44 and a button electrode 46. Each imaging pad 40 may include a number of button electrodes 46 and one or more current return electrodes 44. Any suitable number (e.g., 5, 7, 8, 9, 10, 12, 15, 20, 24, 25, 26, or any appropriate number) of button electrodes 46 may be disposed on each imaging pad 40. Also, any suitable number (e.g., 1, 2, 3, 4, or 5) of current return electrodes 44 may be disposed on each imaging pad 40. It should be appreciated by one of ordinary skill in the art that additional button electrodes 46 may increase the azimuthal borehole coverage of an imaging pad 40, thereby improving the performance of the imaging pad 40. The electrodes (e.g., current return electrodes 44 and button electrodes 46) are situated at the front end of the pad cover 52. Additionally, the imaging pad 40 includes electronics 48 that control the operation (e.g., obtaining data, transmitting data to the data processing system 28) of the current return electrodes 44 and button electrode(s) 46. The electronics 48 may be protected by a shield 49 (e.g., electronic shield) disposed at a rear face of the pad cover 52, which may be formed of a conductive material that substantially forms a Faraday cage that may prevent or substantially reduce electromagnetic waves external to the electronics 48 from reaching the electronics 48, which could otherwise produce crosstalk with the measurement signals from the button electrode 46. The current return electrodes 44, button electrode 46, the electronics 48, and the shield 49 of the imaging pad 40 are all fixedly coupled to the pad cover 52. In general, the pad cover 52 of the imaging pad 40 protects electrodes 42 (e.g., current return electrode(s) 44, button electrode(s) 46) and the electronics 48 from the conditions within the borehole (e.g., high pressure and/or temperature) as well as mechanical stress (e.g., impact) between the walls of the borehole and the imaging pad 40.

As illustrated, the imaging pad 40 may sense an electrical property of the geological formation 14 via the operation of the electrodes 42 (e.g., current return electrode 44 and button electrode 46) and the electronics 48, as described herein. As discussed above, the imaging pad 40 may be in contact with the geological formation 14 during sensing. For example, a front portion of the imaging pad 40 may be in contact with the exterior walls of the geological formation 14. As such, the imaging pad 40 may be subject to mechanical stress due to forces (e.g., friction) between the imaging pad 40 and the geological formation 14. Additionally, the imaging pad 40 may be in contact with an external layer 54 of the geological formation 14 (e.g., a thin layer of mud, oil-based mud, or water-based mud). As such, one consideration in the design of an imaging pad 40 is to be leak resistant.

Figure 4:
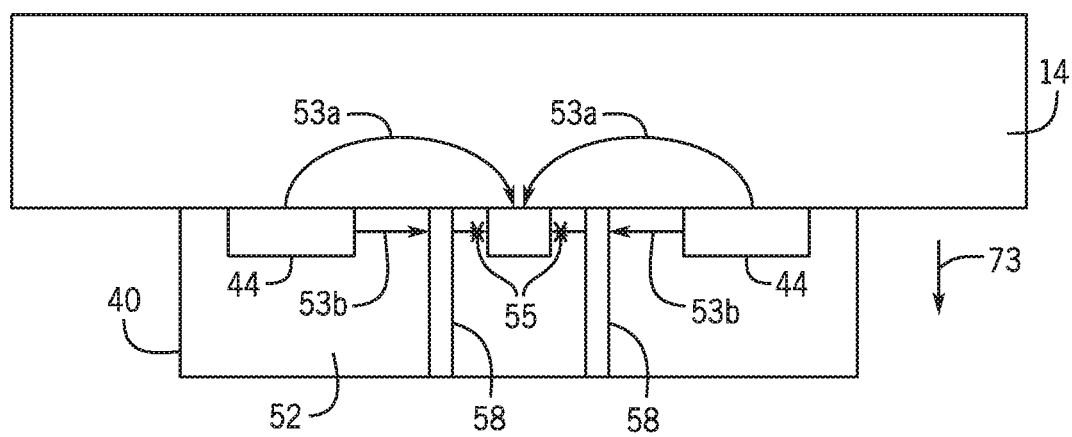
FIG. 4 is a schematic illustration showing a cross section of an example of an imaging pad.

FIG. 4 shows an example of certain imaging pads 40 in operation, in accordance with an embodiment of the present disclosure. In general, the imaging pad 40 measures electrical properties of the geological formation 14 at least in part by sending and/or receiving electrical or electromagnetic signal 53 that has passed through the geological formation 14. As illustrated, the current return electrodes 44 transmit or receive electrical or electromagnetic signal 53a, which may be received by the button electrodes 46. Electrical or electromagnetic signal 53 that passes through the geological formation 14 may be attenuated, and the magnitude of the attenuation is indicative of the composition of the geological formation 14 (e.g., water, oil, type of rock, etc.) As such, a portion of electrical or electromagnetic signal 53b that passes through the pad cover 52 may not be useful in the determination of the composition of the geological formation 14. Guard electrodes 58 are disposed such that they surround the button electrodes 46 and extend along the depth of the imaging pad 40 (e.g., as indicated by arrow 73), which prevents (e.g., indicated by arrow 55) the electrical or electromagnetic signal 53b from being received by the button electrode 46. In other words, the guard electrode 58 may shield a portion of the electronics from receiving electrical or electromagnetic signal 53b that has not passed through the geological formation 14 (e.g., electrical current and/or electromagnetic radiation that would not be indicative of properties of the geological formation 14.)

Figure 5A:
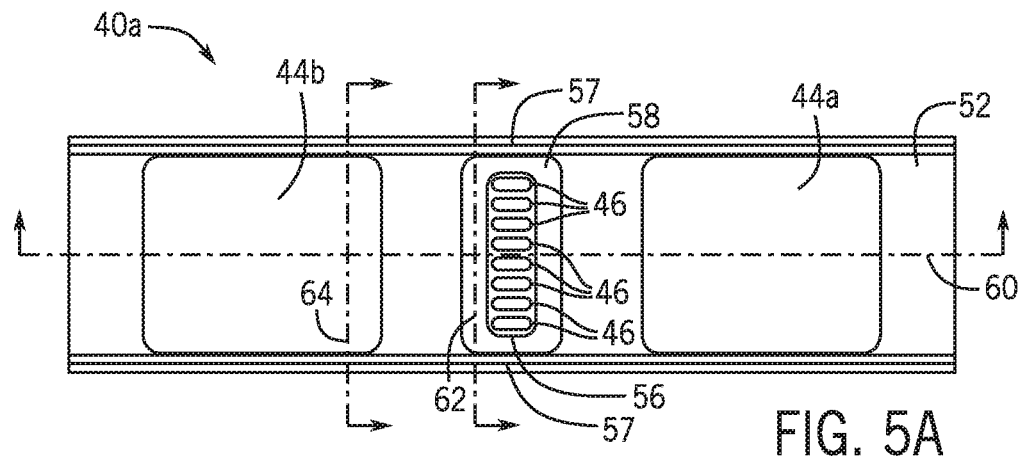
FIG. 5A is a schematic illustration of an imaging pad in accordance with an embodiment.
Figure 5B:
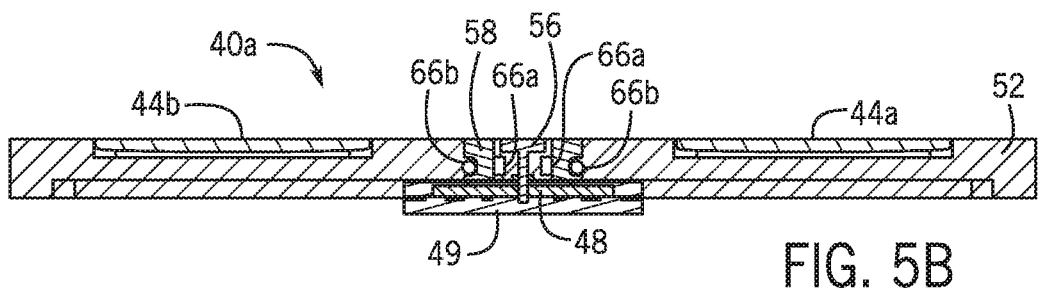
FIG. 5B is a schematic illustration showing a different perspective of the imaging pad of FIG. 5A.
Figure 5C:
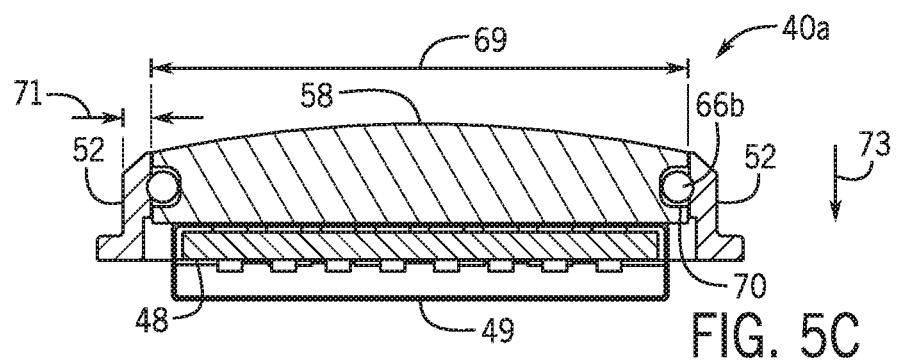
FIG. 5C is a schematic illustration showing a cross section of the imaging pad of FIG. 5A.
Figure 5D:
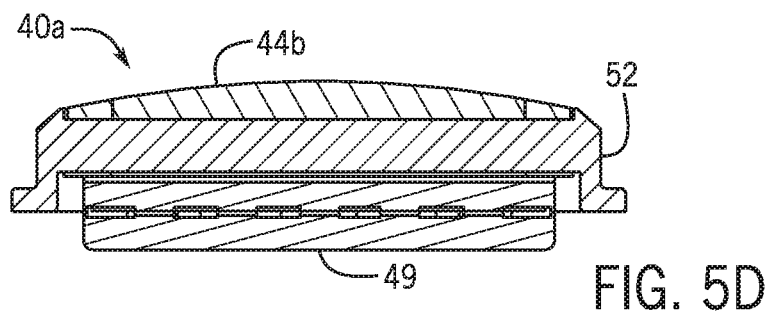
FIG. 5D is a schematic illustration showing a cross section of the imaging pad of FIG. 5A.

FIG. 5A shows an example of certain imaging pads 40a that include two current return electrodes 44a, 44b and a button electrode assembly 56 surrounded by a guard electrode 58, which are coupled to a pad cover 52. The guard electrode 58 may be referred to as a guard electrode ring 58. As illustrated, the button electrodes 46 of the button electrode assembly 56 are arranged 8 by 1. It should be appreciated by one of ordinary skill in the art that the arrangement of the button electrodes 46 may ensure that the button electrode assembly 56 covers a limited portion of the azimuthal circumference of the wellbore 16 as the guard ring width and the structural pad cover material may take up more of the space of the imaging pad 40a. The pad cover 52 may be composed of an insulating material (e.g., plastic, rubber, various polymers, or ceramic), while the current return electrodes 44a, 44b, the button electrodes 46 of the button electrode assembly 56, and the guard electrode 58 may contain a partly non-insulating material (e.g., metal). As such, the imaging pad 40 may include structural features that facilitate the coupling of the electronic components to the pad cover 52. FIGS. 5B, 5C, and 5D show cross sections of the imaging pad 40a along axes 60, 62, and 64 respectively.

FIG. 5B shows a cross section of the imaging pad 40 from FIG. 5A along the axis 60. Additionally, FIG. 5B includes a sealing component 66a, 66b that is disposed around the button electrodes 46, and guard electrode 58, and couples or seals the button electrodes 46, and guard electrode 58 to the pad cover 52. In some embodiments, the coupling components 66a, 66b may be a material such as a resin, polymer, or adhesive material may facilitate coupling. In other embodiments, a portion or the entirety of the pad cover 52 may be composed of an elastic, or partially compliant, material to facilitate coupling between the pad cover 52 and the electronic components (e.g., guard electrode 58, current return electrodes 44a, 44b, and button electrodes 46) without the need of the coupling component 66a, 66b. For example, an inner portion (e.g., along the depth 73) of the pad cover 52 that is flush (e.g., in direct contact) with guard electrode 58, current return electrodes 44a, 44b, and button electrodes 46 may be formed of a compliant material.

The guard electrode 58 and the shield 49 partially surround the electronics 48, at the back (e.g., side opposite of the current return electrodes 44a, 44b) of the pad cover. FIG. 5C shows a cross section of the imaging pad 40 from FIG. 5A along the axis 62. In particular, the guard electrode 58 is shown sitting in a recess that extends along a width 69 and depth 73 (e.g. along the direction indicated by the arrow 73) of the pad cover 52, and a recess 70 that holds the coupling component 66b. Further, the guard electrode 58 is in contact with the electronic 48 and covering the top portion of the electronics 48 (e.g., the portion facing the button electrode assembly 56). Moreover, the guard electrode 58 extends through more than half of the depth 73 of the pad cover 52. As a result, the pad cover has a small cross-section area (e.g., shown on one side of the imaging pad 40a along the distance 71 and extending along the depth 73), which may make the imaging pad 40 too fragile for certain downhole conditions. As shown in FIG. 5C, the top of the guard electrode 58 extends above the pad cover 52. In some embodiments, the top of the guard electrode 58 may extend beyond the pad cover 52 while in other embodiments the top of the guard electrode 58 may be the same height as the pad cover 52. FIG. 5D shows a cross section of the imaging pad 40 from FIG. 5A along the axis 64.

Additionally, FIGS. 5B and 5C show that the guard electrode 58 covers the top portion of the electronics 48. Together, the shield 49 and the guard electrode 58 may surround the electronics 48, which may reduce crosstalk during operation of the imaging pad 40a. However, in some embodiments, it may not be necessary to completely surround the electronics 48 to reduce crosstalk.

Figure 6:
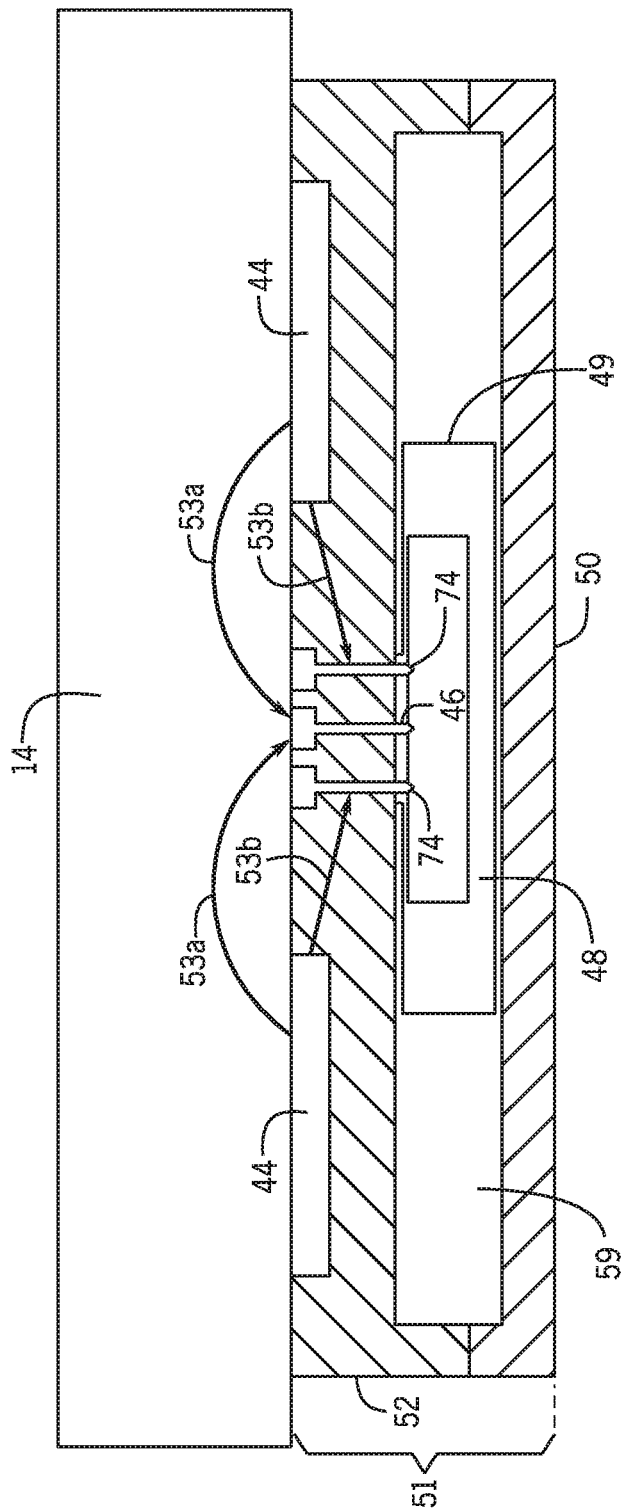
FIG. 6 is a schematic illustration showing a cross section of another example of an imaging pad.

FIG. 6 shows the imaging pad 40 in operation that has a guard electrode 58 that does not completely surround the button electrodes 46, in accordance with an embodiment of the present disclosure. The imaging pad 40 includes a pad cover 52 and a case 50 (e.g., back cover). The case 50 surrounds a portion of the electronics 48, and the electronics 48 may reside in a volume 59, and is in contact with the pad cover 52. The pad cover 52 and the case 50 may be collectively referred to as the housing.

As discussed herein, the imaging pad 40 measures electrical properties of the geological formation 14 at least in part by sending and/or receiving electrical or electromagnetic signal 53 that has passed through the geological formation 14. As illustrated, the current return electrodes 44 transmit or receive electrical or electromagnetic signal 53a, which may be received or transmitted by the button electrodes 46. Electrical or electromagnetic signal 53 that passes through the geological formation 14 may be attenuated, and the magnitude of the attenuation and/or change in phase may be indicative of the composition of the geological formation 14 (e.g., water, oil, type of rock, etc.) As such, a portion of electrical or electromagnetic signal 53b that passes through the pad cover 52 may not be useful in the determination of the composition of the geological formation 14. The pins 74, which may couple to the guard electrode 58, are disposed such that they surround the button electrodes 46, which prevents (e.g., indicated by arrow 55) the electrical or electromagnetic signal 53b from being received or transmitted by the button electrode 46. In particular, in some embodiments, when the pins extend through the entirety of the depth (e.g., in the direction of the arrow 73), the guard electrode 58 may not extend through the entirety of depth of the imaging pad 40 or the pad cover 52. As shown, the pins 74 extend along the depth of the guard electrode 58; however, in some embodiments, the pins 74 may extend along a portion of the depth of the guard electrode 58. In some embodiments, the guard electrode 58 includes the pins 74. That is, the guard electrode 58 and pins 74 may be a single unit. The pins 74 may mechanically couple the guard electrode to the pad cover 52 and may electronically connect it to the electronics 48.

As discussed further below, the imaging pad 40 includes guard electrode 58 with pins 74 that may prevent (e.g., indicated by arrow 55) the button electrodes 46 from receiving electrical or electromagnetic signal 53b that has not passed through the geological formation 14 (e.g., electrical current and/or electromagnetic radiation that would not be indicative of properties of the geological formation 14). The distance between the pins 74 should be significantly smaller (e.g., more than an order of magnitude) than the wavelength of the electrical or electromagnetic signal 53b. For example, the wavelength of the electrical current and/or electromagnetic radiation may be on the order of magnitude of several meters and the distance between the pins 74 may be on the order of centimeters. It should be appreciated that the shielding effectiveness may change accordingly with the wavelength for a given distance between pins 74.

Figure 7A:
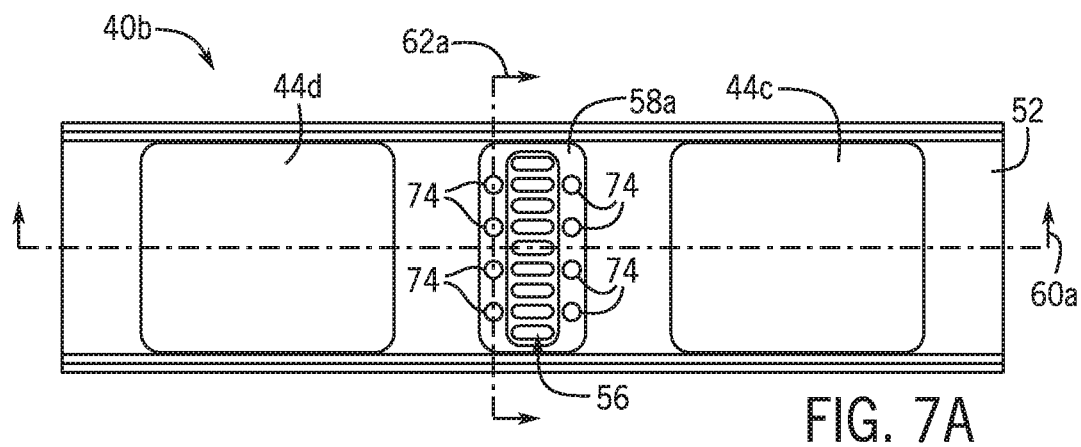
FIG. 7A is a schematic illustration of an imaging pad in accordance with an embodiment.
Figure 7B:
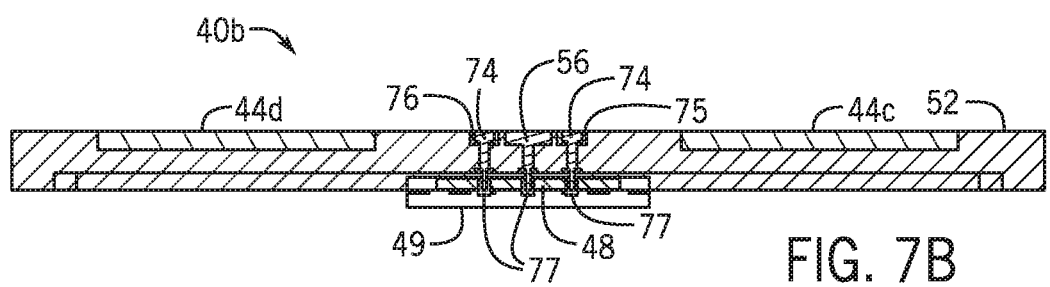
FIG. 7B is a schematic illustration showing a different perspective of the imaging pad of FIG. 7A.
Figure 7C:
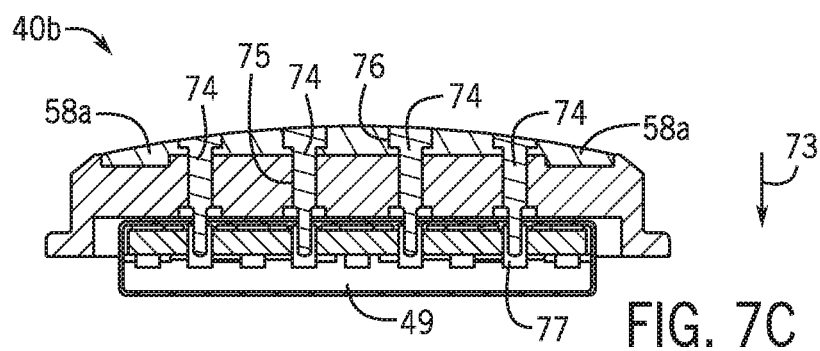
FIG. 7C is a schematic illustration showing a cross section of the imaging pad of FIG. 7A.

FIGS. 7A, 7B, and 7C shows an imaging pad 40b with pins 74 that rest in holes (e.g., the holes are co-axial with the pins 74) in a guard electrode ring 58a situated on a front face of the pad cover 52. FIG. 7A shows an imaging pad 40 that includes two current return electrodes 44c, 44d and a button electrode assembly 56. The perimeter of the button electrode assembly 56 is surrounded by the guard electrode ring 58a, which is coupled to a pad cover 52. The guard electrode ring 58a is coupled to the pad cover 52 via a different coupling component (e.g., pins 74). The pins 74 may be screw, nails, bolts, etc. The pins may preferable be press-fitted into the insulation material. In this case, the pins may include castellations (i.e., protrusions) that will ensure sealing between the exterior of the pad and the electronics 48. The pins also electrically connect the guard electrode ring 58a to the electronics 48.

Referring briefly to imaging pad 40a, as illustrated in FIGS. 5A, 5B, 5C, and 5D, when the guard electrode 58 is directly electrically connected to the electronics 48 and therefore extend from the top of the pad cover to the bottom, the guard electrode separates the pad into two parts (each containing the return electrode) only mechanically connected via portions of insulating material 57 situated at each extremity of the electrode This may pose some limitations on the distribution of space for the guard electrode 58. However, by coupling the guard electrode ring 58a to the electronics 48 via pins 74, as shown in FIG. 7A, the insulating material may connect the two parts of the pad between the pins over a portion 73 of depth of the pad cover between the ring 58a and the electronics 48, and not only via the portion situated at the extremities of the guard ring 58a. This may reduce certain space constraints and allow more preferential arrangements within the pad cover 52. For example, the thickness of the guard electrode 58a may vary around the perimeter of the button electrode assembly 56 or may be situated closer to the edge of the pad. As such, the button electrode assembly 56 includes an additional button electrode 46 than what was shown in FIG. 5A, which may increase the performance of the imaging pad 40a. Furthermore, as the sealing may be ensured by the connection between the pins and the insulating material, for instance via castellations (e.g., shown in element 90 of FIG. 10), it may not be necessary to add coupling elements, such as O-rings 66, which generally have a shorter life than the rest of the pad and therefore shorten the life of the entire pad and/or complicate the maintenance of the tool by necessitating replacement.

FIG. 7B shows a cross section of the imaging pad 40b from FIG. 7A along the axis 60a, and further illustrates the coupling between components (e.g., the guard electrode 58, and the electronics 48.) In particular, each of the pins 74 are residing in holes 75 that extend through the pad cover 52. The shield 49 may include a corresponding recess 77 for each of the pins 74. However, other embodiments for connecting the pins to the electronics are possible. As such, the pins 74 extend through a respective hole 75 and mechanically couple the guard electrode 58 to the pad cover 52 and electronically connect it to the electronics 48. The guard electrode ring 58a may also comprise an additional plurality of holes 76 that each align with a respective hole of the plurality of holes 75 of the pad cover to form a plurality of continuous holes such that the plurality of pins reside in the plurality of continuous holes to support the guard electrode ring against forces along the axial direction of the plurality of pins. It is appreciated that the ring and pins may also be formed in one piece.

FIG. 7C shows another cross section of the imaging pad 40 from FIG. 7A along the axis 62a. In particular, the pins 74 couple the guard electrode 58 to the pad cover and electronics. As illustrated in FIG. 7C, the guard electrode ring 58a does not extend from the top of the pad cover to the bottom of the pad cover 52, but a portion of the depth 73 of the pad cover 52. As such, the pad cover 52 extend between the pins on the entire width of the pad cover which ensures better reliability and durability of the pad compared to the pad of FIG. 5 for which the pad cover in the central part of the pad extend only on the cross section 71 (e.g., shown in FIG. 5C)

As illustrated in FIGS. 7A, 7B, and 7C, the guard electrode ring 58a is mechanically coupled to the pad cover 52 (and in some embodiments to the shield 49) and electronically connected to the electronics 48 by 8 pins 74 that reside in holes 75, which align with holes 76. The guard electrode 58 may be coupled to the pad cover by any number of pins 74 (e.g., 2, 3, 4, 5, 6, 7, 9, 10, etc.) as long as the spacing between the pins 74, and spacing between the holes 75 is significantly smaller (e.g., by at least approximately an order of magnitude, at least 50 times) than the wavelength of electromagnetic radiation of the electrical or electromagnetic signal (e.g., between 1-100 kHz, a few MHz, or approximately 50 MHz). For example, the pins 74 may be spaced by a few centimeters (e.g., 1, 2, 3, etc.). As shown, the pins 74 and holes 75 are aligned linearly on respective sides of the guard electrode 58; however, it should be appreciated that the pins 74 and holes 75 may also be staggered or other arrangements as long as the spacing is significantly smaller than the wavelength of electromagnetic radiation of the electrical or electromagnetic signal. The shield 49 may include recesses 77, which couple to the pins 74. A further advantage of using pins 74 may be reduced cost and complexity as well as increase reliability and maintenance reduction.

Figure 8:
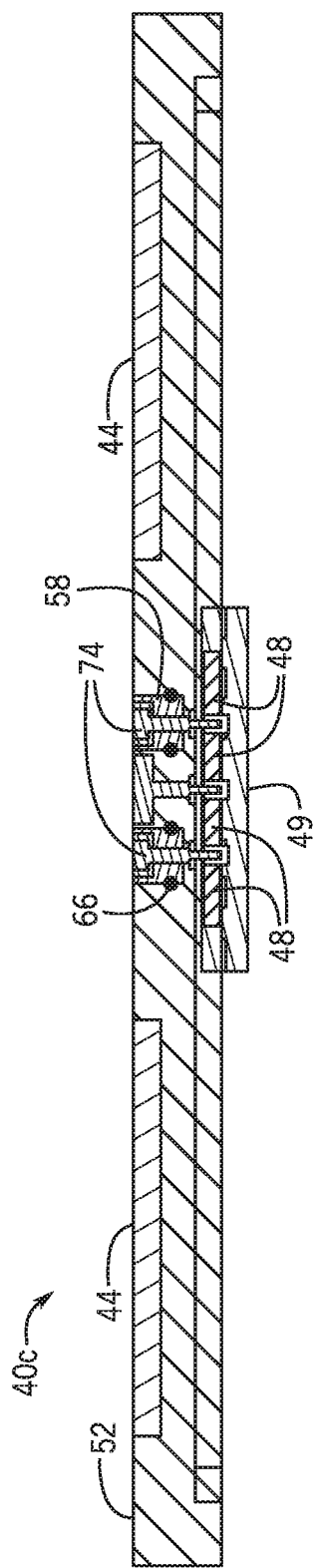
FIG. 8 is a schematic illustration of an imaging pad in accordance with an embodiment.

In some embodiments, a combination of the a ring 58a that has a greater depth than the ring of FIG. 7 and is sealed to the pad cover via coupling component 66 and the pins 74 may provide a suitable balance of the advantages of either technique described herein. FIG. 8 shows an imaging pad 40c that includes a combination of pins 74. For example, fewer pins 74 than what was shown in FIG. 7A may be used in combination with a deeper ring sealed to the pad cover via the coupling component 66 (e.g., O-rings). Each pin 74 resides in a guard electrode ring 58. As illustrated, the guard electrode ring 58a extends along a portion of the depth 73 of the pad cover 52, and the portion is greater than what has been shown on FIG. 7.

Figure 9:
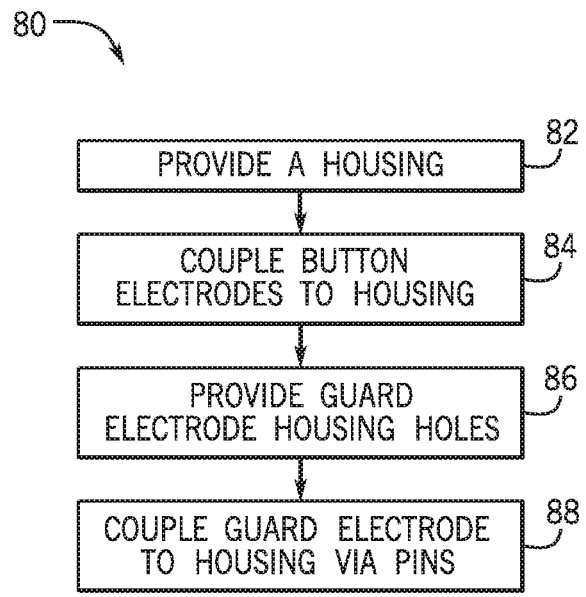
FIG. 9 is a flow diagram for a method of manufacturing an imaging pad, in accordance with an embodiment.

FIG. 9 represents a flow diagram of one embodiment of a method 80 for assembling the imaging pad 40. In block 82, a pad cover 52 for the imaging pad 40 is provided or formed with any suitable method of manufacturing. The pad cover 52 may be composed of a nonconductive material, such as plastic (e.g., PEEK or other suitable polymers), rubber, or ceramic. As discussed herein, the pad cover 52 may have one more recesses as shown in FIGS. 5C and 7C. In block 84, the one or more button electrodes 46 may be coupled to the pad cover 52. The button electrodes 46 may have pins that may be positioned in corresponding recesses in the pad cover 52. In block 86, the guard electrode 58 may be disposed such that it surrounds the one or more button electrodes 46. The guard electrode 58 may include one or more holes 75 that extend along the depth (e.g., in the direction 73 as shown in FIG. 7C) of the imaging pad 40 or pad cover 52. The holes 75, and consequently the pins 74, are spaced a distance such that they are smaller than a wavelength of the electrical or electromagnetic signal 53 (e.g., as shown in FIG. 6) transmitted by the button electrode 46, and thus, substantially preventing electrical or electromagnetic signal 53 that has not passed through the geological formation 14 from being received by the current return electrodes. In block 88, one or more pins 74 are provided in the holes 75 to couple the guard electrode 58 to the pad cover 52. In some embodiments, the pins 74 may be positioned via an interference fit (e.g., press-fit), resulting from applying a suitable force to position them within the holes 75. Thus, the pins 74 may maintain their position in the holes 75 due to a friction fit. In some embodiments, block 84 may come after block 86 and/or block 88.

Figure 10:
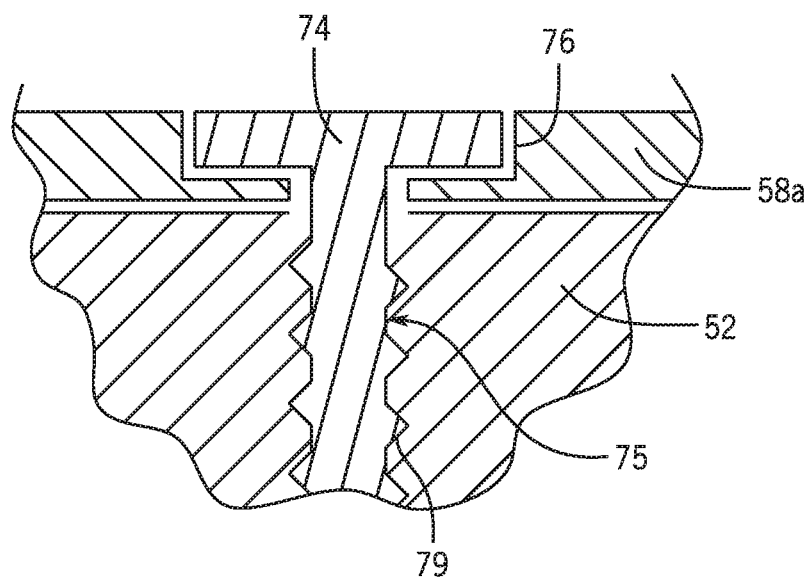
FIG. 10 is a schematic illustration showing a cross section of an imaging pad that includes pins, in accordance with an embodiment.

FIG. 10 is an illustration of a cross section of an imaging pad that has a pin 74 including castellations 79 is shown disposed in the pad cover 52 on FIG. 10. The pin with castellations 79 resides in a hole 75 of the pad cover 75. Further, the pin with castellations 79 is in contact with the pad cover 52 along the hole 75. The castellations 79 shown on FIG. 10 are pointy and have a thickness that increase continuously in the axial direction in order to more easily enter in the holes 75 of the pad cover. It would be appreciated by one of ordinary skill in the art that a directional shape (e.g., pointy) may facilitate low force insertion of the pins 74, which would decrease the risk of damage during assembly. Further, the shape may be such that a higher force is needed for extraction of the pin 64, which may decrease the risk of undesired loss or degradation of the pin 74.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An apparatus for measuring properties of an underground geological formation, comprising:
a pad cover containing electronics;
one or more button electrodes coupled to the pad cover, wherein the one or more button electrodes are configured to transmit or receive an electrical or electromagnetic signal through the underground formation;
one or more current return electrodes couple to the pad cover, wherein the one or more current return electrodes are configured to receive or transmit the electrical or electromagnetic signal through the underground formation; and
a guard electrode disposed at least partly around the one or more button electrodes, wherein the guard electrode is configured to block portions of the electrical or electromagnetic signal that did not pass through the underground formation, wherein the guard electrode comprises:
a guard electrode ring extending along a portion of a depth of the pad cover, and
a plurality of pins electrically connecting the guard electrode ring to the electronics and residing in respective holes of a plurality of holes of the pad cover.

2. The apparatus of claim 1, wherein the plurality of pins are configured to fixedly couple the guard electrode ring to the pad cover to support the guard electrode against forces along the axial direction of the plurality of pins.

3. The apparatus of claim 2, wherein the guard electrode ring comprises an additional plurality of holes that each align with a respective hole of the plurality of holes of the pad cover to form a plurality of continuous holes such that the plurality of pins reside in the plurality of continuous holes to support the guard electrode ring against forces along the axial direction of the plurality of pins.

4. The apparatus of claim 1, wherein each pins of the plurality of pins comprises castellations.

5. The apparatus of claim 1, wherein each hole of the plurality of holes is separated from a nearest hole of the plurality of holes by a distance that is at least 50 times smaller than a wavelength of the electrical or electromagnetic signal to prevent the one or more button electrodes from transmitting or receiving the portions of the electrical or electromagnetic signal that did not pass through the underground formation.

6. The apparatus of claim 1, wherein the plurality of pins of the guard electrode is coupled to the pad cover via a press-fit.

7. The apparatus of claim 1, wherein each hole of the plurality of holes is arranged in a generally linear direction on a respective side of the guard electrode.

8. The apparatus of claim 1, wherein the guard electrode has a varying thickness along the portion surrounding the perimeter of the one or more button electrodes.

9. The apparatus of claim 1, wherein the guard electrode ring is disposed on a front face of the pad cover and the electronics are disposed on a rear face of the pad cover.

10. The apparatus of claim 1, wherein the pad cover is composed of polyether ether ketone (PEEK) that facilitates the coupling of the guard electrode to the pad cover via a press-fit.

11. A method of manufacturing an apparatus for measuring properties of an underground geological formation surrounding a borehole, comprising:
providing a pad cover;
coupling one or more button electrodes to the pad cover, wherein the one or more button electrodes are configured to transmit or receive an electrical or electromagnetic signal through the underground geological formation while the apparatus is disposed in a borehole in the underground geological formation;
coupling one or more current return electrodes to the pad cover, wherein the one or more current return electrodes are configured to receive or transmit the electrical or electromagnetic signal; and
coupling a guard electrode to the pad cover, wherein the guard electrode surrounds a perimeter of the one or more button electrodes, wherein the guard electrode is configured to block portions of the electrical or electromagnetic signal that do not pass through the underground formation, and wherein the guard electrode comprises a guard electrode ring and a plurality of pins, wherein coupling the guard electrode to the pad cover includes coupling the pins to the pad cover.

12. The method of claim 11, wherein the pad cover comprises a plurality of holes suitable for facilitating the positioning of the plurality of pins.

13. The method of claim 12, wherein each hole of the plurality of holes is separated from a nearest hole of the plurality of holes by a distance that is at least 50 times smaller than a wavelength of the electrical or electromagnetic signal to prevent the one or more button electrodes from transmitting or receiving the portions of the electrical or electromagnetic signal that did not pass through the underground formation by a distance that is less than a wavelength of the electrical or electromagnetic signal.

14. The method of claim 11, wherein the pins facilitate coupling of the guard electrode to the pad cover via a press-fit.

15. An apparatus for determining properties of an underground geological formation, comprising:
a pad cover containing electronics;
one or more button electrodes coupled to the pad cover, wherein the one or more button electrodes are configured to transmit or receive an electrical or electromagnetic signal through the underground formation;
one or more current return electrodes couple to the pad cover, wherein the one or more current return electrodes are configured to receive or transmit the electrical or electromagnetic signal through the underground formation; and a guard electrode disposed at least partly around the one or more button electrodes, wherein the guard electrode is configured to block portions of the electrical or electromagnetic signal that did not pass through the underground formation, and wherein the guard electrode comprises a plurality of pins that extend from the guard electrode that electrically connect the guard electrode to the electronics and residing in respective holes of a plurality of holes of the pad cover.

16. The apparatus of claim 15, wherein the guard electrode comprises a guard electrode ring extending along a portion of a depth of the pad cover, and wherein the plurality of pins electrically connect the guard electrode ring to the electronics and reside in respective holes of the plurality of holes of the pad cover.

17. The apparatus of claim 15, comprising one or more O-rings that couple the pad cover, the one or more button electrodes, and the guard electrode.

18. The apparatus of claim 15, wherein the coupling of the guard electrode, one or more pins of the plurality of pins, or both, is accomplished via a press-fit.

19. The apparatus of claim 15, wherein an inner portion of the pad cover comprises a compliant material configured to facilitate the coupling between the pad cover and one or more button electrodes, or the guard electrode.

\* \* \* \* \*